United States Patent
O'Reilly et al.

(10) Patent No.: US 10,891,283 B2
(45) Date of Patent: Jan. 12, 2021

(54) SYSTEM AND METHOD FOR PRESERVING INTERDEPENDENT CORPORATE DATA CONSISTENCY IN A GLOBALLY DISTRIBUTED ENVIRONMENT

(71) Applicant: D&B BUSINESS INFORMATION SOLUTIONS, Dublin (IE)

(72) Inventors: Conor O'Reilly, Dublin (IE); Telmo Inacio de Sousa Felix, Dublin (IE); Cian Craddock, Dublin (IE)

(73) Assignee: D&B BUSINESS INFORMATION SOLUTIONS, Dublin (IE)

( * ) Notice: Subject to any disclaimer, the term of this patent is extended or adjusted under 35 U.S.C. 154(b) by 734 days.

(21) Appl. No.: 15/074,627

(22) Filed: Mar. 18, 2016

(65) Prior Publication Data
US 2016/0275135 A1 Sep. 22, 2016

Related U.S. Application Data
(60) Provisional application No. 62/136,055, filed on Mar. 20, 2015.

(51) Int. Cl.
*G06F 16/11* (2019.01)
*G06F 16/23* (2019.01)
(Continued)

(52) U.S. Cl.
CPC ........ *G06F 16/2365* (2019.01); *G06F 16/254* (2019.01); *G06F 16/27* (2019.01)

(58) Field of Classification Search
CPC ......... G06F 17/30159; G06F 17/30194; G06F 3/065; G06F 3/067; G06F 11/1446;
(Continued)

(56) References Cited

U.S. PATENT DOCUMENTS
5,987,506 A 11/1999 Carter et al.
6,298,345 B1 * 10/2001 Armstrong, Jr. .... G06F 11/1471
(Continued)

FOREIGN PATENT DOCUMENTS
CN 101216832 7/2008
JP 2002116939 A 4/2002

OTHER PUBLICATIONS
New Zealand First Examination Report dated Aug. 10, 2018 from corresponding New Zealand Patent Application No. 735616, 4 pages.
(Continued)

*Primary Examiner* — Alex Gofman
*Assistant Examiner* — Linh Black
(74) *Attorney, Agent, or Firm* — Ohlandt, Greeley, Ruggiero & Perle, L.L.P.

(57) ABSTRACT

A system and method that preserves consistency of corporate data including interdependent corporate data in a globally distributed environment. The system comprises: a network; a user interface in communication with the network; at least one local data storage in communication with the network, wherein the local data storage comprises a plurality of local data records pertaining to business entities; a global data storage in communication with the network, wherein the global data storage comprises a plurality of global data records generated from local data records received from the at least one local data storage; a computer comprising a processor and memory in communication with the network, wherein the processor: determines the latest update point of an update record and a global data record; and if the latest date reference for the update record differs from the global data record, the computer determines which record will take precedence, thereby producing at least one precedence
(Continued)

record element; an assembler; and a distributor which distributes the final update record to the user.

17 Claims, 6 Drawing Sheets

(51) Int. Cl.
*G06F 16/27* (2019.01)
*G06F 16/25* (2019.01)

(58) Field of Classification Search
CPC .............. G06F 11/1464; G06F 16/178; G06F 16/1844; G06F 16/256; G06F 11/3082; G06F 16/275; H04M 15/00; H04M 15/41; H04M 15/43; H04M 15/44
USPC ....... 707/610–612, 624, 635, 694, 726, 756, 707/758, 797, 800
See application file for complete search history.

(56) References Cited

U.S. PATENT DOCUMENTS

| | | | | |
|---|---|---|---|---|
| 7,844,973 | B1* | 11/2010 | Dice .................. | G06F 9/52 707/799 |
| 7,860,826 | B2* | 12/2010 | Freedman ............. | G06F 16/256 707/610 |
| 10,049,340 | B2* | 8/2018 | Notani ............... | G06Q 10/0833 |
| 2003/0110140 | A1* | 6/2003 | Morrison, III ..... | G06Q 30/0283 705/400 |
| 2005/0021713 | A1* | 1/2005 | Dugan .............. | H04M 3/42136 709/223 |
| 2006/0294151 | A1 | 12/2006 | Wong et al. | |
| 2007/0192176 | A1* | 8/2007 | Onischuk ............. | B42D 15/00 705/12 |
| 2011/0295643 | A1* | 12/2011 | Miller ................ | G06Q 10/10 705/7.23 |
| 2012/0101990 | A1 | 4/2012 | Holenstein et al. | |
| 2012/0173481 | A1* | 7/2012 | Poth ................ | G06Q 10/10 707/608 |
| 2014/0006357 | A1* | 1/2014 | Davis ................ | G06F 11/1464 707/667 |
| 2014/0006465 | A1* | 1/2014 | Davis ................ | G06F 17/30194 707/827 |
| 2014/0040213 | A1* | 2/2014 | Rossi ................ | G06F 16/9535 707/693 |
| 2014/0095249 | A1* | 4/2014 | Tarakad ............ | G06Q 30/0621 705/7.25 |
| 2014/0207735 | A1* | 7/2014 | Canac ................ | G06F 13/4217 707/611 |
| 2014/0376379 | A1* | 12/2014 | Fredette ............... | G06F 15/167 370/236 |
| 2015/0370827 | A1* | 12/2015 | Parkison ............ | G06F 16/1844 707/626 |

OTHER PUBLICATIONS

International Preliminary Report on Patentability dated Jul. 7, 2017 from corresponding International PCT Application PCT/IB2016/000463, 18 pages.
International Search Report dated Jul. 18, 2016 from corresponding PCT/IB2016/000463, pp. 5.
International Written Opinion dated Jul. 18, 2016 from corresponding PCT/IB2016/000463, pp. 8.
Japanese Office Action dated Nov. 13, 2018 in corresponding Japanese Patent Application No. JP2017-567561, 6 pages.
Canadian Office Action dated Jul. 6, 2020 in corresponding Canadian Patent Application No. 2,980,241, 6 pages.
Chinese Office Action dated Aug. 20, 2020 in corresponding Chinese Patent Application No. 201680023260.8, 22 pages.

* cited by examiner

SYSTEM AND METHOD FOR PRESERVING INTERDEPENDENT CORPORATE DATA CONSISTENCY IN A GLOBALLY DISTRIBUTED ENVIRONMENT

CROSS-REFERENCED APPLICATIONS

This application claims priority of U.S. Provisional Application No. 62/136,055, filed on Mar. 20, 2015, which is incorporated herein in its' entirety by reference thereto.

BACKGROUND

1. Field of the Disclosure

This disclosure relates to a method for preserving a consistency of interdependent corporate data in a distributed environment in which concurrent and partial updates of data is permitted.

2. Discussion of the Background Art

Interdependent corporate data can be generally defined as including, for example, firmographics, contact details, linkage (including family trees), analytic scoring data and any other acquired and/or derived business information.

There are many solutions to the general data consistency problem. Traditional database consistency techniques focus on ensuring data is synchronized between distributed databases at a raw data level. In contrast, maintaining consistency for interdependent corporate data goes beyond traditional database consistency challenges and has to consider how to maintain the consistency of the data from a business perspective. For example, risk scores are calculated on a subset of an organization's financial data. To maintain corporate data consistency, the underlying financial data and calculated risk scores (both interconnected) must be in sync when presented to a consumer of the data.

TECHNICAL PROBLEM

The technical problem associated with parallel business processes and multiple technology systems is that the corporate data can get out of sync if, for example, one team updates the financial data while the risk scores are being calculated on the old financial data.

In some cases, the business data resides in distributed data stores. The diversity of this corporate information means it is very likely that separate parts are updated independently by multiple teams (e.g., data entry) and multiple systems (e.g., risk scoring). These updates are unlikely to be done at the same time, resulting in potential inconsistency.

For reporting purposes the consistency of this data is imperative. However, maintaining consistency when the data is distributed globally and not every system may be always online becomes a challenge. Offline data stores need to update themselves in a manner that ensures the consistency and accuracy of the corporate data, keeping in mind that not every data store will have the full universe of possible data. Techniques used for standard database replication and consistency are too simple to cover the complex use-cases around maintaining corporate data consistency.

There are many technical challenges for general data consistency, including global data consistency and temporal integrity, consistency of the interdependencies in the data, decoupling inventory data from vending data, quality and latency of the data vended, and organizing data into hundreds of products customized by market, regulation and customer.

Thus, there is a need for preserving interdependent corporate data consistency in a globally distributed environment that allows concurrent and partial updates.

SUMMARY

A system and method for preserving the consistency of interdependent corporate data in a distributed environment where updates are allowed in parallel to some or all of the records related a unique corporate identity, which may include numbers, alphabetic characters, and or other symbols organized alone or in combination.

The system for preserving the consistency of data in a globally distributed environment, comprises:
a network;
a user interface in communication with the network;
at least one local data storage in communication with the network, wherein the local data storage comprises a plurality of local data records pertaining to business entities;
a global data storage in communication with the network, wherein the global data storage comprises a plurality of global data records generated from local data records received from the at least one local data storage;
a computer comprising a processor and memory in communication with the network, wherein the processor:
  (a) receives a request from a user interface via the network for an update record pertaining to a business entity;
  (b) obtains the update record from the local data records stored in at least one the local data storage and compares the update record against at least one global data record stored in the global data storage, wherein the global data storage comprises data previously received from at least one of the local data storage;
  (c) determines the latest update point of the update record and the global data record; and
  (d) if the latest date reference for the update record differs from the global data record, the computer determines which record will take precedence, thereby producing at least one precedence record element;
an assembler which assembles the precedence record element together with additional record elements of the entity associated with the precedence record element retrieved from at least one other data storage repository, thereby forming a final update record; and
a distributor which distributes the final update record to the user.

The system further comprises: a translator which converts a unique identifier of the final update record to a different unique identifier used by the user prior to being distributed. The translator converts the unique identifier of the final update record via canonical conversion.

The system further comprises: a packager which packages the converted unique identifier of the final update record in an interface designated by the user. The interface comprises an application programming interface.

The system further comprises a user data store which is remote from the local data storage and global data storage.

The system further comprises, prior to passing the precedence record element to the assembler, determining if the update record and/or the global data record include interdependent data elements, wherein if the interdependent data elements have different latest date reference, then holding up forming the final update record until latest date references for the interdependent data elements coincide.

The system further comprises, prior to passing the precedence record element to the assembler, conducting an interdependency check of a name of the business entity stored in a linkage repository to ensure consistent use of a correct entity name for linked company names in the final update record.

The system further comprising a vending data storage which stores the final update record prior to distributing to the user.

A method for preserving the consistency of data in a globally distributed environment, the method comprising: maintaining corporate data of a plurality of entities in at least one local data storage; receiving a request from a user for an update record from the corporate data; obtaining the update record from the corporate data stored in at least one the local data storage and comparing the update record against at least one global data record received from a global data storage, wherein the global data storage comprises data previously received from at least one of the local data storage; determining the latest update point of the update record and the global data record; if the latest date reference for the update record differs from the global data record, determining which record will take precedence; assembling the precedence record elements together with additional record elements of the entity associated with the precedence record retrieve from at least one other data storage repository, thereby forming a final update record; and distributing the final update record to the user.

The method further comprises: prior to distributing to the user, translating a unique identifier of the final update record to a different unique identifier used by the user.

The method further comprises: packaging the final update record in an interface designated by the user. The interface comprises an application programming interface.

The method further comprises distributing the final update record to a user data store which is remote from the local data storage and global data storage.

The method further comprises, prior to the steps of assembling and distributing, determining if the update record and/or the global data record include interdependent data elements, wherein if the interdependent data elements have different latest date reference, then holding up forming the final update record until latest date references for the interdependent data elements coincide.

The method further comprises, prior to the steps of assembling and distributing, conducting an interdependency check of entity names stored in a linkage repository to ensure consistent use of a correct entity name for linked company names in the final update record.

A non-transitory memory media for preserving a consistency of corporate data in a globally distributed environment, comprising a program module configured for operation with a processor to provide the following steps: maintaining corporate data of a plurality of entities in at least one local data storage; receiving a request from a user for an update record from the corporate data; obtaining the update record from the corporate data stored in at least one the local data storage and comparing the update record against at least one global data record received from a global data storage, wherein the global data storage comprises data previously received from at least one of the local data storage; determining the latest update point of the update record and the global data record; if the latest date reference for the update record differs from the global data record, determining which record will take precedence; assembling the precedence record elements together with additional record elements of the entity associated with the precedence record retrieve from at least one other data storage repository, thereby forming a final update record; and distributing the final update record to the user.

BRIEF DESCRIPTION OF THE DRAWINGS

Other and further objects, advantages and features of the present disclosure will be understood by reference to the following specification in conjunction with the accompanying drawings, in which like reference characters denote like elements of structure and.

DETAILED DESCRIPTION OF THE PREFERRED EMBODIMENT

Figure 1:
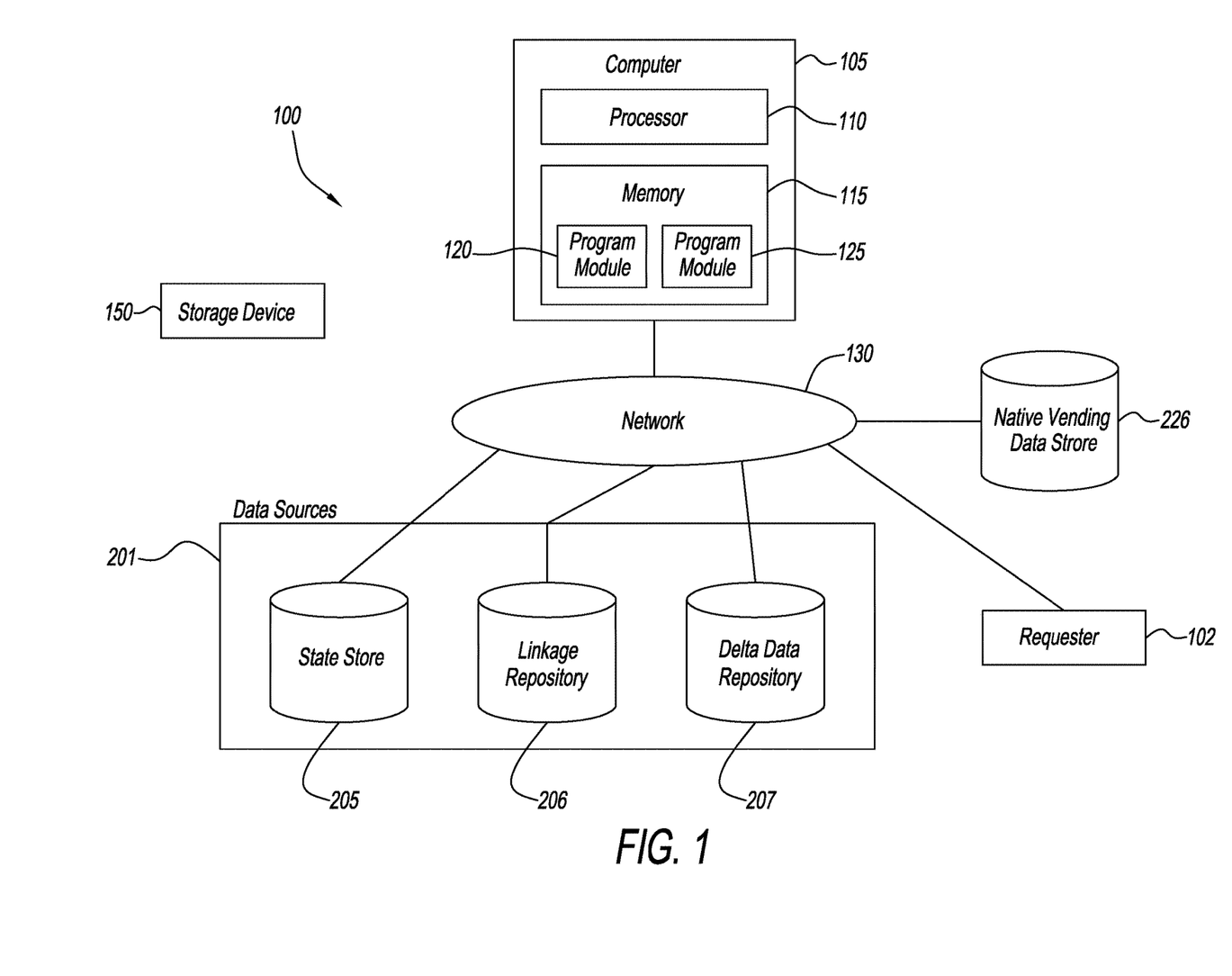
FIG. 1 is a block diagram of a system for carrying out the method according to the present disclosure.
Figure 2:
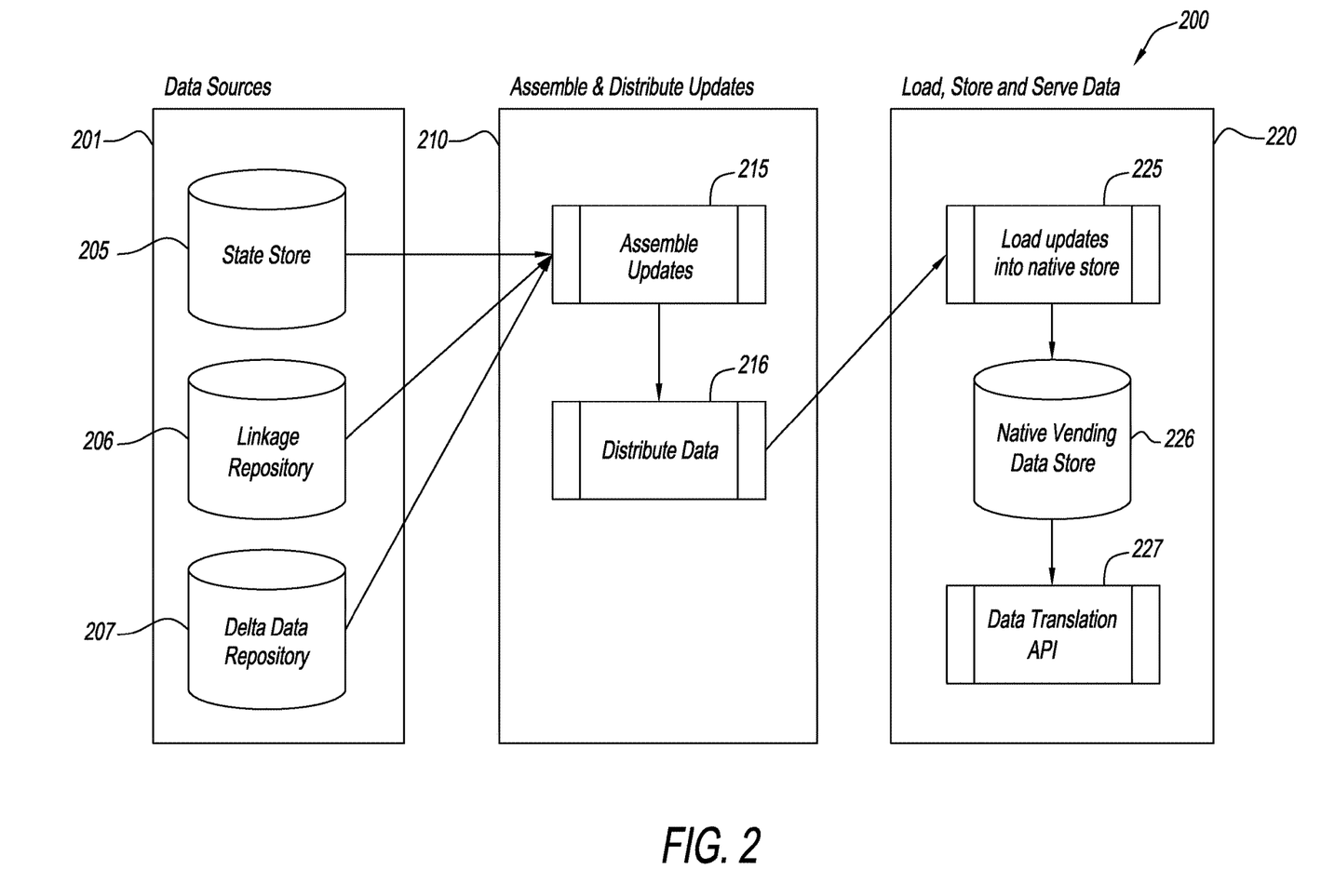
FIG. 2 is a block diagram of the method that assembles interdependency consistent updates of data for a requester.

Referring to FIGS. 1 and 2, an exemplary system 100 is shown for providing execution of a method 200 of the present disclosure. Referring firstly to FIG. 1, system 100 comprises a computer 105, a requester 102, sources 201, and a native vending data store 226 that are each interconnected with a network 130, which may be a private network or a broader network, for example, the internet. Sources 201 comprise a state store 205, a linkage repository 206 and a delta data repository 207 and or other data bases. In some embodiments, there may be one or more computers, requesters, sources and vending data stores.

Computer 105 comprises a processor 110 and a memory 115. A program module 120 and a program module 125 are disposed in memory 115. Processor 110 is operable to execute instructions of program modules 120 and 125 for performing method 200, using network 130, requester 102, native vending data store 226 and one or more of state store 205, linkage repository 206, and delta data repository 207.

While program modules 120 and 125 are shown as already loaded into memory 115, either or both may be configured on a storage device 150 for subsequent loading into memory 115. Storage device 150 is a tangible, non-transitory, computer-readable storage device that is capable of storing program module 125 or 126 thereon. Examples of storage device 150 include a compact disk, a magnetic tape, a read only memory, an optical storage medium, a hard drive or a memory unit consisting of multiple hard drives, and a universal serial bus (USB) flash drive. Alternatively, storage device 150 can be a random access memory, or other type of electronic storage device, located on a remote storage system and coupled to computer 105 via network 130.

System 200 overcomes the various disadvantages of current data replication approaches as they pertain to corporate data. That is, system 200 makes all, or a subset of, the full universe of corporate data available to requesting processes in a manner that preserves interdependencies within that data, in an environment where updates to the central data repository are occurring continuously and in a sequence that cannot be predetermined. Furthermore, system 200 removes any requirement to store the requesting data in the same format as the central repository.

system 200 comprises the steps of (i) receiving from requester 102 a request to update native vending data store 226 containing corporate data, (ii) assembling all of the required updates from delta data repository 207 to ensure requester 102 is up-to-date, (iii) including all interdependency data, (iv) distributing the updates to requester 102, (v) loading all updates into native vending data store 226 and applying a canonical name conversion, and (vi) providing a method for presenting the data.

Referring to FIG. 2, processor 110 initiates step (i) upon receipt of an update request, initiates steps (ii) and (iii) at a box 210 to use an assemble update process 215 to assemble interdependency consistent updates of corporate data to assure that requester 102 is up-to-date. Processor 110 also initiates step (iv) at box 210 to use a distribute data process 216 to distribute the updates in a generic format to requester 102 and to box 220. Processor 110 further initiates step (v) at box 220 to use a load updates process 225 to load all the updates into a native vending store 226 and then to a data translation process 227.

Figure 3:
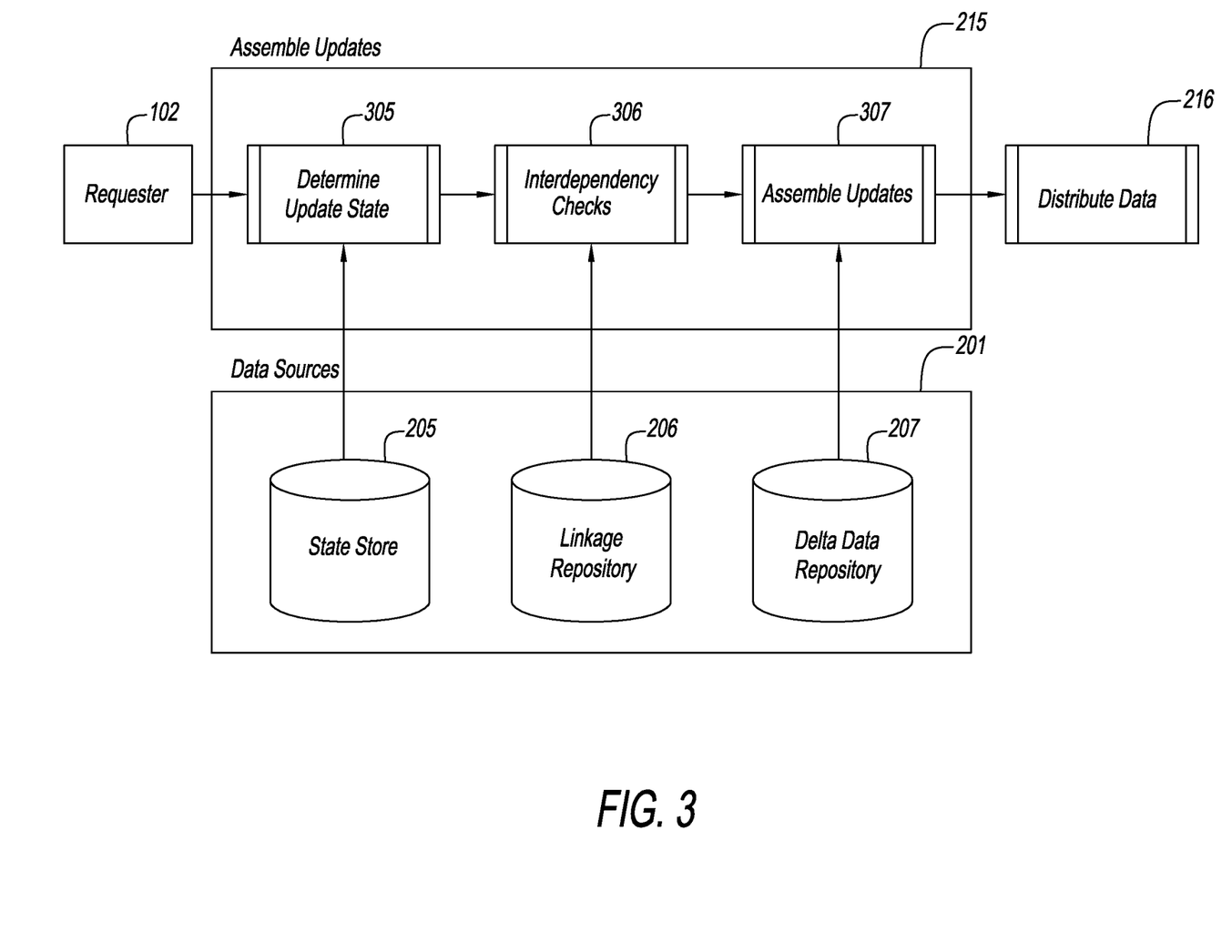
FIG. 3 is a block diagram of a part of the method of FIG. 2 for assembling and distributing updates of data.

Referring to FIG. 3, processor 110 initiates assembly update process 215 to respond to a request from requester 102, wherein (a) at box 305 system 200 determines a current update state level from state store 205, which determines how many updates are required, (b) at box 306 system 200 undertakes an interdependency check between all entities from linkage repository 206 and (c) at box 307 system 200 assembles all updates including updates from delta data repository 207. The assembled update data is then passed at box 216 to box 220 (FIG. 2).

Figure 4:
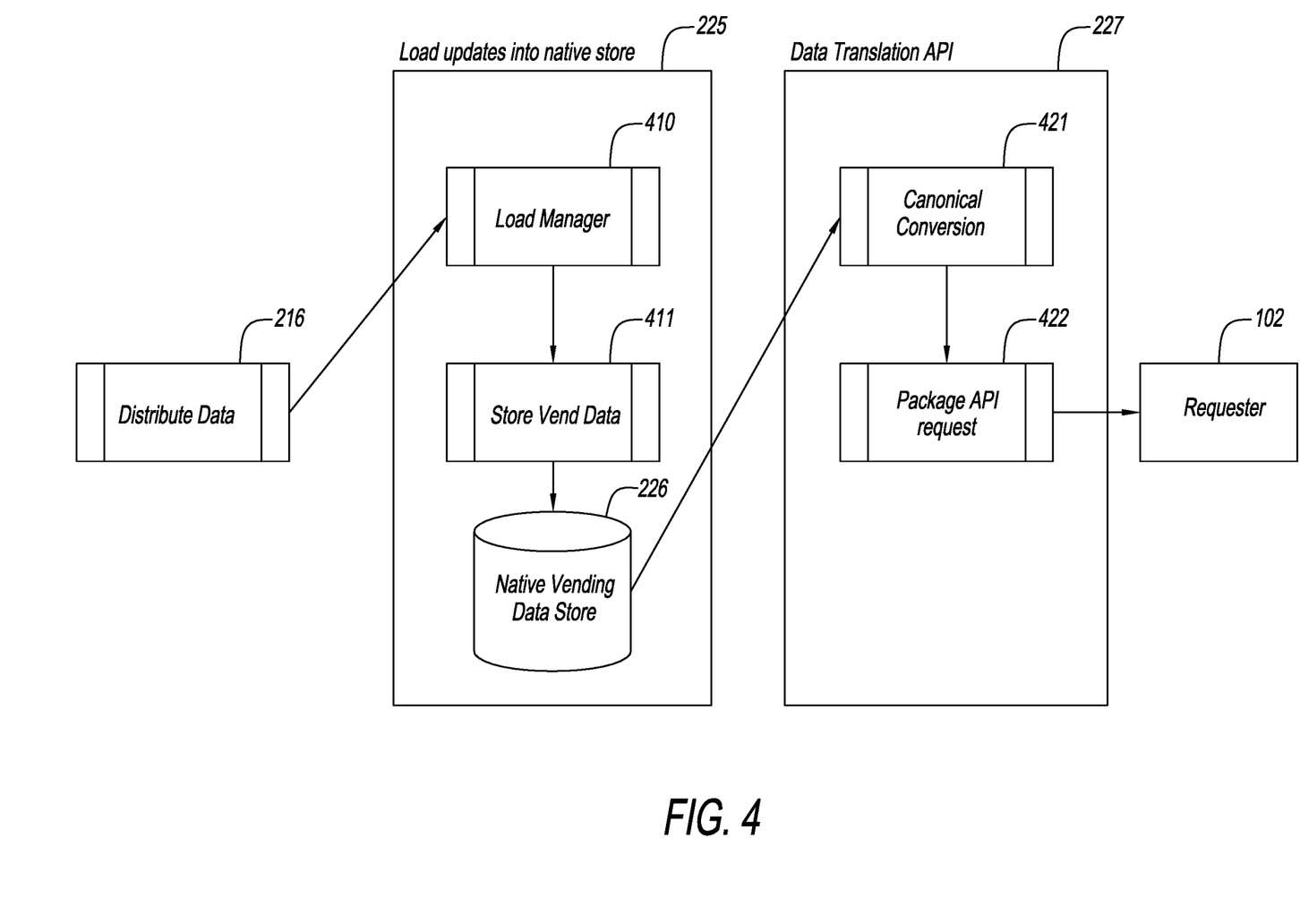
FIG. 4 is a block diagram of a part of the method of FIGS. 2 and 3 for loading and translating the updates for the requester.

Referring to FIG. 4, processor 110 initiates process 225 at a load manager box 410 to receive update data from box 216 and load the update data to a store vend data box 411 for storage in a native vending data store 226. Processor 110 further initiates data translation process 227 to perform a conversion from an internal canonical naming convention 421 to a naming convention requested by requester 102. The converted data is then provided to requester 102.

Figure 5:
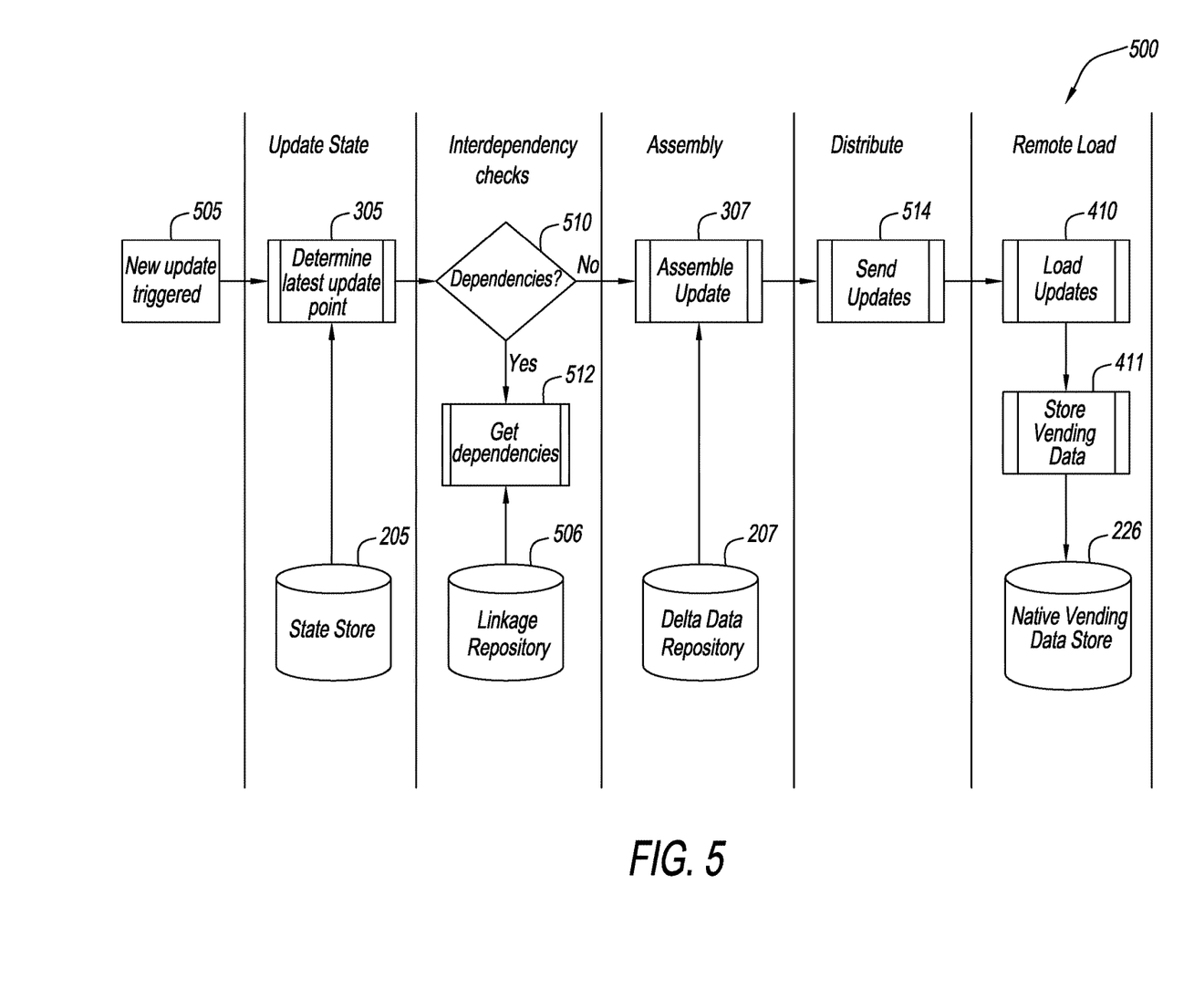
FIG. 5 is a flow diagram of operations performed by a program module of the system of FIG. 1.

Referring to FIG. 5, a flow diagram 500 is indicative of steps (i), (ii), (iii), (iv) and (v). Processor 110 executes instructions of program module 125 (FIG. 1) to perform the operations described in flow diagram 500. At box 505, a new update is recognized. At box 305, the latest update point is determined by accessing state store 205. At box 510, it is determined if there are any interdependencies. If no, the procedure advances to box 307. If yes, at box 512 the interdependencies are obtained by accessing linkage repository 206 and then the procedure advances to box 307. At box 307, updates acquired from state store 205 and/or linkage repository 206 are assembled with any updates from delta data repository 207. At box 514, the updates are distributed to a remote load updates box 410 and a store vending data box 411 for storage in native vending store 226. For the purpose of method 200, state store, 205, linkage repository 206 and delta data repository 207 are read only data bases.

Figure 6:
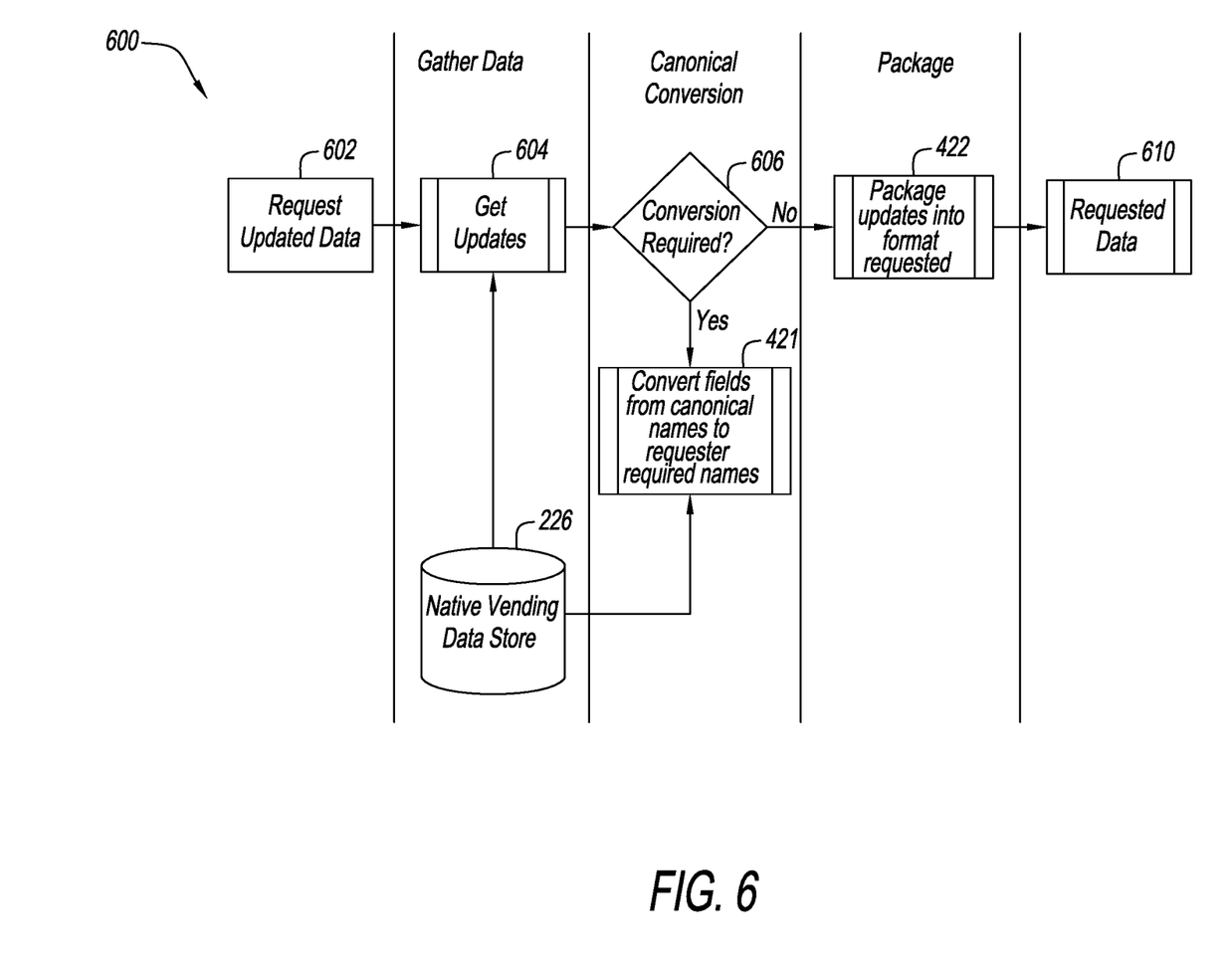
FIG. 6 is a flow diagram of further operations performed by the program module of the system of FIG. 1.

Referring to FIG. 6, a flow diagram 600 is indicative of operations for gathering the updates and converting the updates to a format used by a remote user or vendor, i.e. steps (vi) and (v). At box 602, a receipt of a request for updated data is recognized. At box 604, the requested updated data is retrieved from native data store 226. At box 606, it is determined if conversion of the update is needed. For example, system 100 may use a unique identifier for the data and the vendor may use a different unique identifier. If it is determined at box 606 that conversion is required, at box 421 the fields of the data are converted from the unique identifier (e.g., canonical names) of system 100 to the different identifier of the requester.

At box 422, the updates are packaged into a requested format. For example, the data may be or made available through an Application Programming Interface (API) in a format designated by requester 102.

Examples

This is an example showing how a small number of interdependent data files, each containing business data describing business entities, can be processed through the system in a way that preserves data consistency, despite the globally distributed nature of the source databases that supplies the data files Each source file resides in a different database repository. These repositories are distributed in a different geographical location, with responsibility for updating and maintaining each repository sitting with different teams. Some repositories can be external to the central database storage facilities.

Each source repository agrees to send updates to the system 100, however, the frequency of these updates varies because of the differences between repositories and processes. Some repositories will provide data files daily, others weekly, monthly, quarterly, annually or on demand.

Broadly speaking these files are of three (3) different types—delimited, fixed width, or XML, however, within these different broad types the exact format and the definition of the data within, varies from file to file.

The effect of this means that despite the same record existing in different files, the data relating to that record is updated at varying frequency cadences, leading to data inconsistency issues.

'Record' in this example refers to an input row in one of the source files. Each record is uniquely identified and the same identifier is present in each source file. Each record refers to business data on a single company. So in the below example, 'Record B' is present in both the Global File and the Local File 1, 'Record D' is present in both the Global File and the Local File 2, 'Record A' is unique to Global File, and so on.

Scenario which Explains the Flow Through FIGS. 5 and 6

Four source files delivered data to the system. Each contains a date reference in addition to business data elements on each record. This date reference refers to the date that the date that the record within the file was updated. An example date reference would be '20160115' in the YYYYMMDD format, meaning January the 15$^{th}$ of 2016. This date reference is used in process 305 from FIG. 5—'Determine latest update point'

1. Global File—this is a file containing records that represent input data from multiple countries around the world. A country code identifier is present in this file to separate records based on geographical location; to simplify we use the country name in the examples.

In this example, there are seven (7) business data elements for each record within the Global File, and the frequency of this file is daily:

| Global File | | | | | | | |
|---|---|---|---|---|---|---|---|
| 1. Business Name | 2. Country | 3. HQ Record | 4. HQ Business Name | 5. Sales | 6. Financial Statement | 7. Delete Indicator | Date Reference |
| Record A | Albany Ltd | USA | Record B | Berlin Inc | $1000 | 2015 Dec. 31 | False | 2016 Jan. 14 |
| Record B | Berlin Inc | Germany | N/A | N/A | € 2000 | 2015 Dec. 31 | False | 2016 Jan. 14 |
| Record C | Cardiff Plc | Germany | N/A | N/A | £3000 | 2015 Dec. 31 | False | 2016 Jan. 14 |
| Record D | Dublin Co | Ireland | Record C | Cardiff Plc | € 4000 | 2009 Dec. 31 | False | 2016 Jan. 14 |
| Record E | Elbany Ltd | USA | N/A | N/A | $1000 | 2015 Dec. 31 | True | 2016 Jan. 14 |

2. Local Source File 1—this is a file containing records that represent input data from a single country. A country code identifier is present in this file to identify the country.

In this example, we have two (2) business data elements for each record within this Local File, and the frequency of this file is daily:

| Local Source File 1 | 1. Business Name | 2. Country | Date Reference |
|---|---|---|---|
| Record B | Berlin Bookshops GMBH | Germany | 2016 Jan. 14 |
| Record C | Cardiff Cards Public Ltd Co | Germany | 2016 Jan. 14 |

3. Local Source File 2—this is a file containing records that represent input data from a single country that is different to the single country covered in Local File 1. A country code identifier is present in this file to identify the country.

In this example, we have two (2) business data elements for each record within this file, and the frequency of this file is weekly:

| Local Source File 2 | 1. Financial Statement | 2. Country | Date Reference |
|---|---|---|---|
| Record D | 2016 Jan. 31 | Ireland | 2016 Jan. 9 |

4. Delete File—this is a file containing an instruction to delete a record that previously had input data.

In this example, we have two (2) business data elements for each record within this file, and the frequency of this file is monthly:

| Delete File | 1. Delete Indicator | 2. Country | Date Reference |
|---|---|---|---|
| Record E | False | USA | 2016 Jan. 3 |

Expected Output in Native Vending Data Store (FIGS. 5 and 6—Box 226):

All four (4) files are received at various times during a single day. In order to maintain global consistency, the system must understand the dependencies between the files while processing. These are predetermined by the update rules applicable to each business element in each geographical market. To understand these dependencies for the purpose of the example, below is the expected output that you will find in the Native Vending Store 226 for the seven (7) business data elements and four (4) scenarios marked with superscripts 1-4 to help explain the process through the system:

| Native Vending Store (226) | | | | | | | |
|---|---|---|---|---|---|---|---|
| | 1. Business Name | 2. Country | 3. HQ Record | 4. HQ Business Name | 5. Sales | 6. Financial Statement | 7. Delete Indicator |
| Record A | Albany Ltd | USA | Record B | Berlin Bookshops GMBH[2] | $1000 | 2015 Dec. 31 | False |
| Record B | Berlin Bookshops GMBH[1] | Germany | N/A | N/A | € 2000 | 2015 Dec. 31 | False |
| Record C | Cardiff Cards Public Ltd Co[1] | Germany | N/A | N/A | £3000 | 2015 Dec. 31 | False |
| Record D | Dublin Co | Ireland | Record C | Cardiff Cards Public Ltd Co[2] | € 4000 | 2016 Jan. 31[3] | False |
| Record E | Elbany Ltd | USA | N/A | N/A | $1000 | 2015 Dec. 31 | True[4] |

[1] Business Name for Record B and Record C
[2] HQ Business Name for Record A and Record D
[3] Financial Statement for Record D
[4] Delete Indicator for Record E Process to Update the Native Vending Data Store (226) with the Above Data:

From the four (4) files, it can be seen that the Global File provides all seven (7) of the business data elements that are expected in the Native Vending Store 226. However, the other overlapping Local Source Files mean that the process outlined in FIG. 5 is required to determine how to update the data when all dependencies are taken into account.

The four (4) files being processed are the trigger for FIG. 5 box 505—'New update triggered'.

At box 305, the data within the incoming files is assessed to determine the latest update point. The date references in the file, along with custom rules on elements, determine if the update can proceed. We will walk through the examples above to give an indication of this process at box 305.

Multi-source rule when files overlap:
[1] Business Name for Record B and Record C The Business Name is an element that describes the trading name of a particular company. Within this system, the business name can be sourced from multiple different source systems. In this example you can see that this element exists in both the Global File and the Local Source File 1. As mentioned initially, the globally distributed nature of our source systems means that different systems may have different representations of the same business data element. In this example we can see the Business Name element input as:

Record B—'Berlin Inc' in Global File and 'Berlin Bookshops GMBH' in Local Source File 1
Record C—'Cardiff Plc' in Global File and 'Cardiff Cards Public Ltd Co' in Local Source File 1

At box 305, the understanding of this element includes a rule to say that the local version of the Business Name element should take precedence over the global version of the element. It is important to note that the date reference for this element in both files matches—20160114 (Jan. $14^{th}$ 2016). So to determine the update in this case, the system cannot rely on the date reference but instead relies on predetermined sourcing rules to understand that for both of these records the version of the element in Local Source File 1 and not the version in the Global File. These rules exist in box 305 to determine that an update has been made for these elements and the local version is taken through to the next process step.

Date-Driven Rule when Files Overlap
[4] Delete Indicator for Record E

The Delete Indicator is an element that is set as true to inform the customer that a data record no longer exists, or as false to inform the customer that the record is active and current. This indicator can come from multiple sources and requires the date reference within the file to determine the update in box 305.

In this example, it can be seen that this element exists for Record E in the Global File and the Delete File. These files have different frequencies. The Global File is received daily, the Delete File is received monthly. For this reason, the date reference is important as the date reference within each file represents the date that the source system has been informed of a data change and made the update. This means that the system needs to consider these date references in order to determine the update. In this example we can see the Delete Indicator element input as:

Record E—'True' in Global File with date reference '20160114' and 'False' in Delete File with date reference '20160103'

At box 305, the understanding of this element includes a rule to say that the latest date reference should be used from multiple files in order to determine an update when received concurrently. In this example, the date reference 20160114 (Jan. $14^{th}$ 2016) is more recent than 20160103 (Jan. $3^{rd}$ 2016) so this should be considered the most up-to-date and correct value to bring forward to the next processing step. In this example, the most recent value is 'True'. If this process did not consider the update of this element correctly as with certain legacy systems, the incorrect value of 'False' will be taken from the Delete File meaning that the customer is informed of the incorrect deleted state of this record. Because the Delete File is monthly in update, the customer could be out of sync for up to one (1) month on the correct data value if not using a system that considers the Global File as an overlapping source.

State-Driven Rule when Sources Overlap
[3] Financial Statement for Record D

The Financial Statement is a date referring to the reported Sales figure for a company. To the customer, it is important to understand the interdependency between the Sales and the Financial Statement as it does not make sense to update one without the other.

In this example, it can be seen that this element exists for Record D in the Global File and Local Source File 2. These files have different frequencies. The Global File is received daily and Local Source File 2 is received weekly. The date reference on Local Source File 2 is 20160109 (Jan. $9^{th}$ 2016) is more recent than the date reference for Record D in the Global File—20160114 (Jan. $14^{th}$ 2016).

However, because there is a relationship between elements 'Sales' and 'Financial Statement', at box 305 the process must understand this dependency and appropriately use State Store 205 in order to process. So if Local Source File 2 is received on Jan $9^{th}$, and the Global File on Jan $14^{th}$, the Financial Statement should be held in State Store 205 from Jan $9^{th}$ until the Sales is received on Jan $14^{th}$. So 205 is used to hold updates until the additional values are received, and only then can processing move to the next step.

Dependency Check/Linkage Repository

Linkage is a term referring to the relationship between two (2) separate data records. For example, 1 record might be a branch location of another record, and so when the customer requests data on the record, it is important to reflect in the response the linked record associated with it. This associated record is referred to as a Headquarter, or HQ.

In this example we have two (2) records with a HQ Record element populated in the Global File:

Record A lists Record B as HQ Record with HQ Business Name=Berlin Inc
Record D lists Record C as HQ Record with HQ Business Name=Cardiff Plc However, the presence of the HQ Business Name in the Global File is not relevant because at process 510 (Dependencies?) the presence of the HQ Record element prompts process 512 (Get Dependencies) from read-only Linkage Repository 506.

In this process, Record A, by having the HQ Record B, and requiring the HQ Business Name of Record B, needs to lookup the Business Name of Record B and return it as the HQ Business Name within Record A.

This dependency brings back the previous example of Records B and C having their Business Name sourced from Local Source File 1. Because of this, the system maintains consistency by performing this lookup at process 512. The resulting values will then move on to the next processing step:

Record A with HQ Record=Record B with HQ Business Name=Berlin Bookshops GMBH

Record D with HQ Record=Record C with HQ Business Name=Cardiff Cards Public Ltd Co By identifying the dependency at step 510, we can return the correct HQ Business Name from 506 so as to be consistent with the correct Business Names for the linked companies. Without identifying and processing based on this understanding, the system would lead to inconsistency between the Business Names.

Assembly, Distribution and Storage

In process step 307, the Business Elements received from the input files are assembled. These elements are combined with additional date elements from Delta Data Repository 207 that already exist for these Records that are outside of the seven (7) elements updated in this example so there is then a full update record showing all elements available from the State Store 205, Linkage Repository 506 and Delta Data Repository 207.

The fully assembled data is then distributed and loaded to the Native Vending Store 226 through sequential processes 514, 410 and 411. The Native Vending Store 226 will contain at this stage the full and latest view of every Record the system has knowledge of.

Vending of Customer Data

FIG. 6 describes the process for an end user to access the data present in Native Vending Store 226. The end user uses input criteria to request a Record, such as the Record identifier as part of box 602. This request triggers box 604, which prompts the retrieval of the requested Record from Native Vending Store 226. If the requestor is using different input criteria to request the Record, such as an alternative Business Element name or a different identifier, box 606 will determine that a conversion is required. This conversion at process 421 allows the Record to be correctly retrieved from Native Vending Store 226.

Box 422 packages the response from Native Vending Store 226 into the format requested by the requestor 102. This final package is delivered as the final requested data 610.

The present disclosure having been thus described with particular reference to the preferred forms thereof, it will be obvious that various changes and modifications may be made therein without departing from the scope of the present disclosure as defined in the appended claims.

What is claimed is:

1. A system for preserving the consistency of data in a globally distributed environment, comprising:
   a network;
   a user interface in communication with said network;
   at least one local data storage in communication with said network, wherein said local data storage comprises a plurality of local data records pertaining to business entities;
   a global data storage in communication with said network, wherein said global data storage comprises a plurality of global data records generated from local data records received from said at least one local data storage;
   a computer comprising a processor and memory in communication with said network, wherein said processor:
   (a) receives a request from a user interface via said network for an update record pertaining to a business entity;
   (b) obtains said update record from said local data records stored in at least one said local data storage and compares said update record against at least one global data record stored in said global data storage, wherein said global data storage comprises data previously received from at least one of said local data storage;
   (c) determines the latest update point of said update record and said global data record;
   (d) if the latest date reference for said update record differs from said global data record, said computer determines which record will take precedence, thereby producing at least one precedence record element;
   (e) determines that said update record and/or said global data record include interdependent data elements that have different latest date references;
   (f) holds updates for said interdependent data elements in an update store until additional values are received;
   (g) places a hold on formation of a final update record until latest date references for said interdependent data elements coincide; and
   (h) releases said hold on formation of said final update record when latest date references for said interdependent data elements coincide;
   an assembler which assembles said precedence record element together with additional record elements of said entity associated with said precedence record element retrieved from at least one other data storage repository, thereby forming said final update record, further comprising, prior to passing said precedence record element to said assembler, conducting an interdependency check of a name of said business entity stored in a linkage repository to ensure consistent use of a correct entity name for linked company names in said final update record; and
   a distributor which distributes said final update record to a user.

2. The system of claim 1, further comprising:
   a translator which converts a unique identifier of said final update record to a different unique identifier used by said user prior to being distributed.

3. The system of claim 2, further comprising:
   a packager which packages said converted unique identifier of said final update record in an interface designated by said user.

4. The system of claim 3, wherein said interface comprises an application programming interface.

5. The system of claim 1, further comprise a user data store which is remote from said local data storage and global data storage.

6. The system according to claim 2, wherein said translator converts said unique identifier of said final update record via canonical conversion.

7. The system according to claim 1, further comprising a vending data storage which stores said final update record prior to distributing to said user.

8. A method for preserving the consistency of data in a globally distributed environment, said method comprising:
   maintaining corporate data of a plurality of entities in at least one local data storage;
   receiving a request from a user for an update record from said corporate data;
   obtaining said update record from said corporate data stored in at least one said local data storage and comparing said update record against at least one global data record received from a global data storage, wherein said global data storage comprises data previously received from at least one of said local data storage;
   determining the latest update point of said update record and said global data record;

if the latest date reference for said update record differs from said global data record, determining which record will take precedence, thereby producing at least one precedence record element;

determining that said update record and/or said global data record include interdependent data elements that have different latest date references;

holding updates for said interdependent data elements in an update store until additional values are received;

placing a hold on formation of a final update record until latest date references for said interdependent data elements coincide;

releasing said hold on formation of said final update record when latest date references for said interdependent data elements coincide;

assembling said precedence record elements together with additional record elements of said entity associated with said precedence record retrieve from at least one other data storage repository, thereby forming said final update record; further comprising, prior to said step of assembling, conducting an interdependency check of entity names stored in a linkage repository to ensure consistent use of a correct entity name for linked company names in said final update record; and distributing said final update record to said user.

9. The method of claim 8, further comprising:

prior to distributing to said user, translating a unique identifier of said final update record to a different unique identifier used by said user.

10. The method of claim 8, further comprising:

packaging said final update record in an interface designated by said user.

11. The method of claim 10, wherein said interface comprises an application programming interface.

12. The method of claim 8, further comprising distributing said final update record to a user data store which is remote from said local data storage and global data storage.

13. A non-transitory memory media for preserving a consistency of corporate data in a globally distributed environment, comprising a program module configured for operation with a processor to provide the following steps:

maintaining corporate data of a plurality of entities in at least one local data storage;

receiving a request from a user for an update record from said corporate data;

obtaining said update record from said corporate data stored in at least one said local data storage and comparing said update record against at least one global data record received from a global data storage, wherein said global data storage comprises data previously received from at least one of said local data storage;

determining the latest update point of said update record and said global data record;

if the latest date reference for said update record differs from said global data record, determining which record will take precedence, thereby producing at least one precedence record element;

determining that said update record and/or said global data record include interdependent data elements that have different latest date references;

holding updates for said interdependent data elements in an update store until additional values are received;

placing a hold on formation of a final update record until latest date references for said interdependent data elements coincide;

releasing said hold on formation of said final update record when latest date references for said interdependent data elements coincide;

assembling said precedence record elements together with additional record elements of said entity associated with said precedence record retrieve from at least one other data storage repository, thereby forming said final update record; further comprising, prior to said step of assembling, conducting an interdependency check of entity names stored in a linkage repository to ensure consistent use of a correct entity name for linked company names in said final update record; and distributing said final update record to said user.

14. The non-transitory memory media of claim 13, further comprising:

prior to distributing to said user, translating a unique identifier of said final update record to a different unique identifier used by said user.

15. The non-transitory memory media of claim 13, further comprising:

packaging said final update record in an interface designated by said user.

16. The non-transitory memory media of claim 15, wherein said interface comprises an application programming interface.

17. The non-transitory memory media of claim 13, further comprising distributing said final update record to a user data store which is remote from said local data storage and global data storage.

* * * * *